(12) United States Patent
Petley et al.

(10) Patent No.: US 10,060,310 B2
(45) Date of Patent: Aug. 28, 2018

(54) USE OF ACTIVE NOISE SYSTEM

(71) Applicant: JAGUAR LAND ROVER LIMITED, Warwickshire (GB)

(72) Inventors: Dean Petley, Coventry (GB); Simon Fletcher, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/504,876

(22) PCT Filed: Aug. 19, 2015

(86) PCT No.: PCT/EP2015/069027
§ 371 (c)(1),
(2) Date: Feb. 17, 2017

(87) PCT Pub. No.: WO2016/026889
PCT Pub. Date: Feb. 25, 2016

(65) Prior Publication Data
US 2017/0234179 A1    Aug. 17, 2017

(30) Foreign Application Priority Data
Aug. 20, 2014 (GB) .................................. 1414760.7

(51) Int. Cl.
*G10K 11/00* (2006.01)
*F01N 1/06* (2006.01)
(Continued)

(52) U.S. Cl.
CPC ............. *F01N 1/065* (2013.01); *B60Q 5/008* (2013.01); *G10K 11/178* (2013.01); *G10K 11/1788* (2013.01); *B60Y 2200/92* (2013.01);
*B60Y 2306/11* (2013.01); *G10K 2210/12822* (2013.01); *Y10S 903/902* (2013.01)

(58) Field of Classification Search
CPC ....... B60W 10/06; B60W 20/00; Y02T 10/48; Y02T 10/6286; B60L 2240/441; Y10S 903/902; B60Y 2200/92; B60Y 2306/11; F01N 1/065; G10K 11/178;
(Continued)

(56) References Cited

U.S. PATENT DOCUMENTS 5,359,662 A * 10/1994 Yuan .................. G10K 11/1786
381/71.12
2002/0039422 A1    4/2002 Daly
(Continued)

FOREIGN PATENT DOCUMENTS

DE    10 2010 005138 A    7/2011
DE    10 2011 119463 A1   5/2012
(Continued)

OTHER PUBLICATIONS

Combined Search and Examination Report under Sections 17 and 18(3) for Application No. GB 15147016 dated Feb. 22, 2016.
(Continued)

*Primary Examiner* — Thang Tran

(57) ABSTRACT

Aspects of the present invention relate to an active noise system, a controller for an active noise system, a method and a hybrid electric vehicle. The invention relates to use of an active noise system for providing noise when an ICE is not active.

19 Claims, 1 Drawing Sheet

(51) Int. Cl.
*B60Q 5/00* (2006.01)
*G10K 11/178* (2006.01)

(58) Field of Classification Search
CPC ..... G10K 11/1788; G10K 2210/12822; B60K 6/24; B60Q 5/008
See application file for complete search history.

(56) References Cited

U.S. PATENT DOCUMENTS

| | | |
|---|---|---|
| 2011/0010269 A1 | 1/2011 | Ballard |
| 2011/0093149 A1 | 4/2011 | Tanaka |
| 2012/0070012 A1 | 3/2012 | Yoshizawa et al. |
| 2012/0130580 A1 | 5/2012 | Omote et al. |
| 2012/0229267 A1 | 9/2012 | Nakayama |
| 2013/0093578 A1 | 4/2013 | Goto |
| 2013/0142352 A1* | 6/2013 | Koch ........................ H04R 1/22 381/86 |
| 2014/0055258 A1 | 2/2014 | Grosse-Budde |
| 2014/0056438 A1 | 2/2014 | Baalu et al. |
| 2014/0121864 A1 | 5/2014 | Nakatani et al. |
| 2014/0321659 A1* | 10/2014 | Buganza ................. F01N 1/065 381/71.4 |

FOREIGN PATENT DOCUMENTS

| | | |
|---|---|---|
| DE | 10 2011 116635 A1 | 4/2013 |
| DE | 10 2012 023643 A1 | 6/2013 |
| EP | 2 565 082 A1 | 3/2013 |
| WO | 2011/005872 A2 | 1/2011 |
| WO | 2011/098881 A1 | 8/2011 |
| WO | 2014/057105 A2 | 4/2014 |

OTHER PUBLICATIONS

International Search Report and Written Opinion of the International Searching Authority for International application No. PCT/EP2015/069027 dated Nov. 16, 2015.
Combined Search and Examination Report under Sections 17 and 18(3) for Application No. GB 1414760.7 dated Jan. 26, 2015.

* cited by examiner

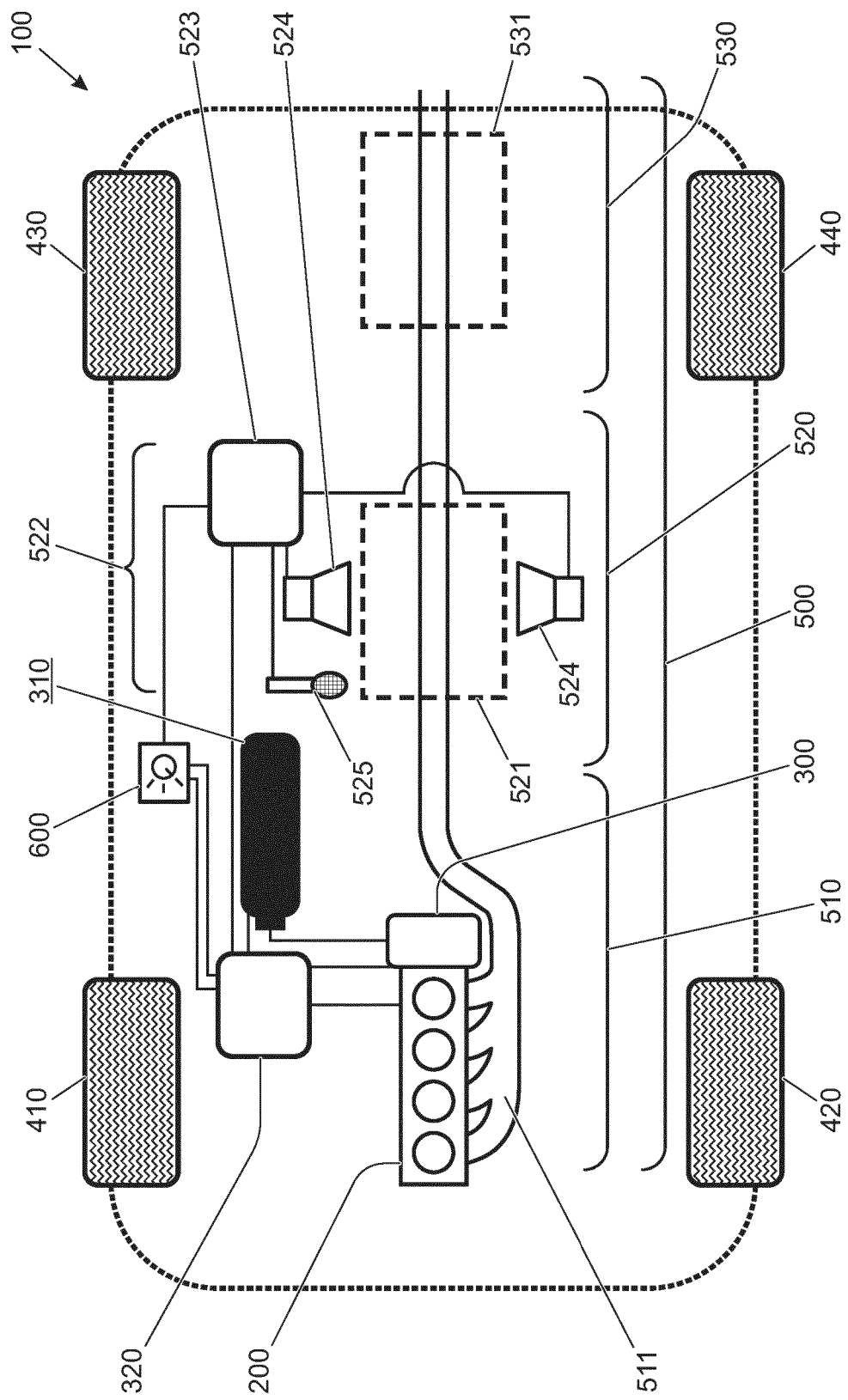

USE OF ACTIVE NOISE SYSTEM

TECHNICAL FIELD

The present invention relates to the use of Active Noise systems for use in modifying the noise emitted by a vehicle, particularly relating to Hybrid Electric Vehicles. There is provided an active noise system, a controller for an active noise system, a method and a hybrid electric vehicle.

BACKGROUND OF THE INVENTION

Hybrid Electric Vehicles are becoming more common. It is known to provide external speaker systems to generate vehicular noise when such vehicles are travelling under electric power in order to provide warning to pedestrians of the vehicle approach. In some jurisdictions this is even becoming legislatively mandated. However, the addition of external speaker systems to generate such noise adds to cost and vehicle complexity. It is an aim of the present invention to address this disadvantage.

It is known to provide noise modification systems in motor vehicles. Such systems typically comprise one of two types—Active Noise systems, in which one or more speaker units are fitted to exhaust systems or elsewhere in a vehicle such as in the occupant cabin, and Active Exhaust systems, in which typically one or more bypass valves are provided within an exhaust system to physically alter the flow path of exhaust gasses through different parts of the exhaust system.

The speakers in Active Noise systems, in conjunction with various control means and methods, are generally used to provide noise waveforms, usually related to and/or derived from the 'natural' noise generated by an Internal Combustion Engine (ICE) exhaust system and/or the ICE itself. These noise waveforms are typically used to 'cancel out', minimise or suppress native exhaust notes, but may also be used to enhance them. Minimising/suppressing/cancelling out of noise may be for the purpose of providing a quiet, 'luxury' driving experience for drivers or passengers of a vehicle, or to minimise external noise of the vehicle, possibly for legislative purposes. Enhancement may be for the purpose of providing a 'sporty' feeling to a driver and/or passengers of a vehicle and/or to provide a particular external noise to indicate the sportiness of a vehicle to bystanders.

SUMMARY OF THE INVENTION

Aspects of the present invention relate to a method, an active noise system, a controller for an active noise system, and a vehicle.

According to an aspect of the present invention there is provided a hybrid electric vehicle capable of electrically powered motion, said vehicle also provided with an ICE; an ICE exhaust system; and a controller as described herein.

In an embodiment, the noise is generated when the vehicle is moving under electrical power. In an embodiment the noise is generated when the vehicle is moving without applied electrical power. This may be the case where, for example, the vehicle is on 'overrun', or slowing down, or is in a drive mode where a controller in the vehicle has determined that power does not need to be applied to maintain vehicle velocity, such as when the vehicle is travelling downhill.

According to an aspect there is provided a controller for an active noise system adapted for use with an ICE exhaust system of a hybrid electric vehicle equipped with an ICE, wherein the controller is arranged to control the active noise system to generate noise in the ICE exhaust system when the ICE is inactive whilst the vehicle is in motion or at a standstill.

In an embodiment, the hybrid vehicle is capable of electrically powered motion and the noise is generated whilst the vehicle is in motion under electrical power.

In an embodiment, the noise is generated whilst the vehicle is in motion without applied electrical power.

The vehicle may comprise a noise sensor and/or speakers acoustically connected to the ICE exhaust system. The noise sensor and/or speakers may be acoustically connected so as to output sound into at least a portion of the exhaust system, thereby obviating the need for any other artificial noise making system elsewhere on the vehicle.

Noise in the ICE exhaust system may be modified by the active noise system. The controller may be adapted to receive a signal from the noise sensor to obtain a reading of noise in the ICE exhaust system and to control the active noise system to modify noise in the ICE exhaust system in dependence on said reading of noise.

Noise generation and noise modification are different. Controlling the active noise system to generate noise may be independent of said reading of noise in the ICE exhaust system.

Modifying noise in the ICE exhaust system may comprise cancelling or enhancing all or part of the noise. The controller may be adapted to receive one or more signals indicative of one or more ICE operating parameters and to control the active noise system to modify noise in the ICE exhaust system in dependence on said one or more ICE operating parameters. The ICE operating parameters may comprise one or more of: engine speed; torque.

The controller may be adapted to receive a signal indicative that the ICE is inactive and to switch from controlling the active noise system to modify noise to controlling the active noise system to generate noise if it is determined that the ICE is inactive.

The controller may be adapted to receive one or more signals indicative of one or more driving operating parameters, and to control said active noise system to generate noise in the ICE exhaust system in dependence on said one or more driving operating parameters, wherein driving operating parameters comprise one or more of: vehicle speed, acceleration, pedal position.

The controller may be adapted to generate noise whilst the vehicle is at a standstill and in an eco-stop condition. The controller may be adapted to generate noise whilst the vehicle is at a standstill and in an EV mode.

In an aspect there is provided an active noise system adapted for use with an ICE exhaust system of a hybrid electric vehicle, wherein the active noise system comprises the controller described herein, and one or more speakers, wherein the controller is arranged to transmit a control signal to cause said one or more speakers to generate noise whilst the vehicle is in motion or at a standstill and the ICE is inactive.

In an embodiment, the vehicle is equipped with a means of electrical propulsion and the noise is generated whilst the vehicle is moving by means of said electrical propulsion.

In an embodiment, the noise is generated whilst the vehicle is moving and the electrical propulsion means is not applying motive power.

In some, but not necessarily all examples there is provided an active noise system adapted for use with an ICE exhaust system of a hybrid electric vehicle, wherein noise is generated by the active noise system when the vehicle is in motion and the ICE is inactive.

In an embodiment, the hybrid electric vehicle is capable of electrically powered motion and the noise is generated whilst the vehicle is in motion under electrical power.

In an embodiment, the noise is generated when the vehicle is in motion with no motive power applied.

There may be provided a hybrid electric vehicle, controller, active noise system or method as described elsewhere herein, wherein the generated noise when the ICE is inactive is substantially replicative of noise that is generated by a vehicle ICE and/or ICE exhaust system when the ICE is active.

The advantage of this arrangement is that a vehicle, particularly a hybrid electric vehicle, and particularly (though not exclusively) a hybrid electric vehicle of the parallel-hybrid type, that may be equipped with an active noise system in conjunction with its exhaust system, nominally for modification or control (such as suppression or cancellation of noise) or optionally enhancement (in a vehicle which is intended to be at times 'sporty', for example) of its engine/exhaust noise, is able to generate a useful noise when in electric only mode without the necessity for extra equipment added for this purpose alone. This fulfills safety (and potentially legislative) requirements of the vehicle without the added cost and complexity of an extra system.

According to some, but not necessarily all examples there is provided a hybrid electric vehicle capable of electrically powered motion, said vehicle also provided with an ICE and an active noise system arranged to modify ICE and ICE exhaust noise, wherein said active noise system is used to generate noise when the vehicle is moving or at a standstill and the ICE is inactive.

According to some, but not necessarily all examples there is provided an active noise system adapted for use with an ICE exhaust system of a hybrid electric vehicle, wherein the active noise system is arranged to generate noise whilst the vehicle is in motion and the ICE is inactive.

For purposes of this disclosure, it is to be understood that the controller described herein can comprise a control unit or computational device having one or more electronic processors.

A vehicle and/or a system thereof may comprise a single control unit or electronic controller or alternatively different functions of the controller may be embodied in, or hosted in, different control units or controllers.

As used herein, the term "control unit" will be understood to include both a single control unit or controller and a plurality of control units or controllers collectively operating to provide the required control functionality.

A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

BRIEF DESCRIPTION OF THE DRAWINGS

One or more embodiments of the invention will now be described, by way of non-limiting example only, with reference to the accompanying drawing, in which:

FIG. 1 shows a schematic representation of a parallel-hybrid vehicle equipped as per aspects and embodiments of the invention.

DETAILED DESCRIPTION

With reference to FIG. 1, there is provided a parallel hybrid-electric vehicle 100 which comprises an ICE 200 and an electric machine (EM) 300 which is integrated as a motor/generator into the driveline of the vehicle. The ICE and the EM are arranged to be able to provide torque individually or together to a powertrain (not shown) which ultimately provides torque to the rear wheels 430, 440 of the vehicle. In other vehicles, power may also be provided to the front wheels 410, 420. The ICE and EM are also arranged so that the EM 300 may act as a generator to provide power to charge a battery 310, either by torque provided by the ICE or by regenerative braking of the vehicle. In other drive modes, the battery 310 provides power to the EM to provide motive power to the vehicle.

The various states of use of the combination of the ICE, the EM and the battery are controlled by controller 320 of the vehicle. The controller 320 may be part of a larger vehicle ECU (electronic control unit), or may be a separate or otherwise integrated ECU, module, or other electronic or computer circuit or program.

Such hybrid electric vehicles, and various alternative embodiments, as well as their use and control systems, are well known in the prior art and will not further be dealt with in detail here.

In at least one drive mode, the vehicle may be provided with motive torque by the EM whilst the ICE is inactive. In at least one drive mode, the vehicle may be in motion whilst the ICE is inactive and the EM may not be supplying torque, or may indeed by supplying an effectively negative torque by acting as a generator.

Some driving modes may be selected by a driver of the vehicle via drive mode selector 600. The ICE 200 produces exhaust gasses, which pass through exhaust system 500 which comprises front section 510 comprising an exhaust manifold 511, centre section 520 comprising a centre box 521, and a rear section 530 comprising a rear box 531. The skilled person will be familiar with such exhaust systems and they need not further be described here.

The vehicle is further equipped with an active noise modification system 522 comprising a controller 523, speakers 524 and a noise sensor 525. The sensor 525 is able to pick up noise generated by the exhaust system 500 and gives a reading to controller 523. Controller 523 is then able to generate a control signal to the speakers 524 which may then act to modify the exhaust noise of the vehicle. Such modification may be a noise-cancelling of all or part of the noise, or may be an enhancement of all or part of the noise. Such systems when acting in this way are in general well known to those skilled in the art.

In the present example, a driver of the vehicle may have selected an 'EV only' mode of the vehicle via selector 600, in which it is desired that (state of charge of battery 310 permitting) the vehicle is driven only by use of the EM 300 and that the ICE 200 is inactive. This may be the case when a vehicle is driven in residential areas which may be 'low emission' zones, for example. In such a state, the vehicle 100 may be effectively silent, and may act to surprise pedestrians as a result.

Alternatively, the vehicle may be travelling at reasonable speed upon a highway or motorway, for example, and a driver of the vehicle may be making no torque demand. Accordingly the vehicle is either slowing down, using the EM 300 as a regenerative braking system, or may be freewheeling. The hybrid controller 320 at this point makes the decision that the vehicle does not require any torque input from the engine 200, and shuts it down.

In either scenario, the vehicle is now in motion but the ICE is inactive and as such the vehicle is making relatively little noise, or may be making noise which to the average pedestrian is not indicative of a 'normal' motor vehicle.

Accordingly, controller 523, which receives a signal from the hybrid controller 320 which indicates that the ICE is inactive but that the vehicle is in motion, outputs a control signal to the speakers 524 which causes them to emit a noise signal. This noise signal is largely reproductive of a noise which might be expected of an ICE. It may be that the proximity of the speakers 524 to centre exhaust box 521 causes the exhaust box 521 to act as a reverberator and add volume and/or bass notes to the noise emitted by the speakers. In some embodiments, the noise emitted and/or thus created by the speakers and/or speaker and exhaust combination may be modulated so as to vary appropriately with the speed of the vehicle. It may be that the noise varies according to the momentary driving action of the vehicle—for example, an ICE typically sounds different according to whether it is accelerating, either gently or hard, is running at a steady state (varying according to speed), or may be providing engine braking. The noise generated by the Active Noise system 522 may vary appropriately depending therefore on if the vehicle itself is accelerating, cruising, or decelerating. The noise generated by the Active Noise System 522 may vary depending on pedal position, such as accelerator, brake or clutch pedal position.

In a further embodiment, it may be that the Active Noise system 522 generates a noise when the vehicle is at a standstill, but is in an EV mode (i.e.: the ICE is inactive) and is ready to begin moving upon application of a torque request by a driver—i.e.: the ignition is 'on'. In such a case the system 522 may generate a noise akin to an engine idling. This may prevent cases of pedestrian surprise at an apparently inactive vehicle beginning to move, for example, as due to the 'engine idling' noise it will register with a pedestrian as 'on' and potentially about to move.

In some, but not necessarily all examples, the vehicle is provided with a stop/start system. The stop/start system is designed to turn the ICE 200 off automatically when pre-defined ICE-stop conditions are met, e.g. that the vehicle is being held stationary with a driver-operated brake pedal depressed. The condition in which the vehicle is held stationary with the ICE 200 automatically switched off during a drive cycle is known as an 'eco-stop' condition. The vehicle need not be in an EV mode, and when the driver releases the brake pedal the ICE 200 may be restarted. The condition of restarting ICE 200 is known as an 'eco-start' condition. In this example the Active Noise System 522 generates noise when the vehicle is at a standstill, and the controller determines that the vehicle is in an 'eco-stop' condition.

The controller 523 may be adapted to receive one or more signals indicative of one or more ICE operating parameters and to control the active noise system to modify noise in dependence on said one or more ICE operating parameters. The ICE operating parameters may comprise engine speed and/or torque, when the ICE is running. In some, but not necessarily all examples, modified or generated noise is dependent on gear ratio.

It will be appreciated that various changes and modifications can be made to the present invention without departing from the scope of the present application. Further aspects of the present invention will now be set out in the accompanying numbered paragraphs:

1. A hybrid electric vehicle capable of electrically powered motion, said vehicle also provided with an ICE and an active noise system arranged to modify ICE and ICE exhaust noise, wherein said active noise system is used to generate noise when the vehicle is moving and the ICE is inactive.

2. A hybrid electric vehicle as described in paragraph 1 wherein the noise is generated when the vehicle is moving under electrical power.

3. A hybrid electric vehicle as described in paragraph 1 wherein the noise is generated when the vehicle is moving without applied electrical power.

4. A controller for an active noise system adapted for use with an ICE exhaust system of a hybrid electric vehicle equipped with an ICE, wherein the controller is arranged to control the active noise system to generate noise when the ICE is inactive whilst the vehicle is in motion.

5. A controller as described in paragraph 4 wherein the hybrid vehicle is capable of electrically powered motion and the noise is generated whilst the vehicle is in motion under electrical power.

6. A controller as described in paragraph 4 wherein the noise is generated whilst the vehicle is in motion without applied electrical power.

7. An active noise system adapted for use with an ICE exhaust system of a hybrid electric vehicle, wherein the active noise system is arranged to generate noise whilst the vehicle is in motion and the ICE is inactive.

8. An active noise system as described in paragraph 7 wherein the vehicle is equipped with means of electrical propulsion and the noise is generated whilst the vehicle is moving by means of said electrical propulsion.

9. An active noise system as described in paragraph 7 wherein the noise is generated whilst the vehicle is moving and the electrical propulsion means is not applying motive power.

10. A method of use of an active noise system adapted for use with an ICE exhaust system of a hybrid electric vehicle, wherein noise is generated by the active noise system when the vehicle is in motion and the ICE is inactive.

11. A method as described in paragraph 10 wherein the hybrid electric vehicle is capable of electrically powered motion and the noise is generated whilst the vehicle is in motion under electrical power.

12. A method as described in paragraph 10 wherein the noise is generated when the vehicle is in motion with no motive power applied.

13. A hybrid electric vehicle, controller, active noise system or method as described in any of paragraphs 1, 4, 7, or 10 wherein the generated noise is substantially replicative of noise that is generated by the vehicle ICE and/or ICE exhaust system when the ICE is active.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

The invention claimed is:

1. A controller for an active noise system, the controller comprising one or more electronic processors and at least one computer-readable storage medium including instructions, the at least one computer-readable storage medium and the instructions configured to, with the one or more electronic processors, cause the controller to at least:
receive a signal indicative of noise in an internal combustion engine (ICE) exhaust system of a vehicle equipped with an ICE to obtain a reading of the noise;
control the active noise system to modify the noise in the ICE exhaust system in dependence on said reading of noise;
receive a signal indicative that the ICE is inactive; and
switch from controlling the active noise system to modify noise in the ICE exhaust system to controlling the active noise system to generate noise in the ICE exhaust system when the ICE is inactive while the vehicle is in motion or at a standstill, in dependence on said signal indicative that the ICE is inactive, wherein the noise is generated by the active noise system in dependence on one or more of: vehicle acceleration and vehicle pedal position.

2. A controller as claimed in claim 1, wherein controlling the active noise system to generate noise is independent of said reading of noise in the ICE exhaust system.

3. A controller as claimed in claim 1, wherein modifying noise in the ICE exhaust system comprises cancelling or enhancing all or part of the noise in the ICE exhaust system.

4. A controller as claimed in claim 3, wherein the at least one computer-readable storage medium and the instructions are configured to, with the one or more electronic processors, cause the controller to at least receive one or more signals indicative of one or more ICE operating parameters and to control the active noise system to modify noise in the ICE exhaust system in dependence on said one or more ICE operating parameters.

5. A controller as claimed in claim 4 wherein the ICE operating parameters comprise engine speed and/or torque.

6. A controller as claimed in claim 1, wherein the at least one computer-readable storage medium and the instructions are configured to, with the one or more electronic processors, cause the controller to at least control the active noise system to generate noise in the ICE exhaust system in dependence on vehicle speed.

7. A controller as claimed in claim 1, wherein the vehicle is a hybrid electric vehicle configured for electrically powered motion and the noise is generated by the active noise system while the vehicle is in motion under electrical power.

8. A controller as claimed in claim 1, wherein the noise is generated by the active noise system while the vehicle is in motion without applied electrical power.

9. An active noise system adapted for use with an ICE exhaust system of a hybrid electric vehicle, wherein the active noise system comprises the controller of claim 1, and one or more speakers controlled by the controller to emit sound to modify the noise in the ICE exhaust system and to generate the noise in the ICE exhaust system.

10. An active noise system as claimed in claim 9 comprising a noise sensor configured to pick up noise generated by the ICE exhaust system and transmit the signal indicative of the noise to provide the reading of said noise to the controller.

11. A hybrid elective vehicle capable of electrically powered motion, said vehicle comprising:
an internal combustion engine (ICE);
an ICE exhaust system; and
a controller comprising one or more electronic processors and
at least one computer-readable storage medium including instructions, the at least one computer-readable storage medium and the instructions configured to, with the one or more electronic processors, cause the controller to at least:
receive a signal indicative of noise in an internal combustion engine (ICE) exhaust system of a vehicle equipped with an ICE to obtain a reading of the noise;
control the active noise system to modify the noise in the ICE exhaust system in dependence on said reading of noise;
receive a signal indicative that the ICE is inactive; and
switch from controlling the active noise system to modify noise in the ICE exhaust system to controlling the active noise system to generate noise in the ICE exhaust system when the ICE is inactive while the vehicle is in motion or at a standstill, in dependence on said signal indicative that the ICE is inactive, wherein the noise is generated by the active noise system in dependence on at least one of: vehicle acceleration and vehicle pedal position.

12. A hybrid electric vehicle as claimed in claim 11, comprising a noise sensor and speakers acoustically connected to the ICE exhaust system.

13. A method of use of an active noise system adapted for use with an internal combustion engine (ICE) exhaust system of a vehicle, wherein the method comprises:
obtaining a reading of noise in the ICE exhaust system comprising receiving a signal indicative of the noise;
modifying the noise in the ICE exhaust system in dependence on said reading of noise,
receiving a signal indicative that the ICE is inactive;
controlling the active noise system to switch from modifying noise in the ICE exhaust system to generating noise in the ICE exhaust system when the vehicle is in motion or at a standstill and the ICE is inactive, in dependence on said signal indicative that the ICE is inactive, wherein the noise is generated by the active noise system in dependence on at least one of: vehicle acceleration and vehicle pedal position.

14. A method as claimed in claim 13, wherein the vehicle is configured for electrically powered motion and the noise is generated while the vehicle is in motion under electrical power.

15. A method as claimed in claim 14, wherein the noise is generated when the vehicle is in motion with no motive power applied.

16. A method as claimed in claim 13, wherein the noise generated by the active noise system when the ICE is inactive is replicative of noise that is generated by the vehicle ICE and/or ICE exhaust system when the ICE is active.

17. A controller as claimed in claim 1, wherein the vehicle is a hybrid electric vehicle.

18. A controller as claimed in claim 1, wherein the at least one computer-readable storage medium and the instructions are configured to, with the one or more electronic processors, cause the controller to at least generate idling noise in the ICE exhaust system when the ICE is inactive and the vehicle is at a standstill.

19. A controller for an active noise system, the controller comprising one or more electronic processors and at least one computer-readable storage medium including instructions, the at least one computer-readable storage medium and the instructions being configured to, with the one or more electronic processors, cause the controller to at least:

receive a first signal indicative of noise in an internal combustion engine (ICE) exhaust system of a vehicle equipped with an ICE to obtain a reading of the noise;

control the active noise system to modify the noise in the ICE exhaust system in dependence on said reading of the noise;

receive a second signal indicative that the ICE is inactive;

determine that the vehicle is in an electric vehicle (EV) mode and/or in an eco-stop condition; and switch from controlling the active noise system to modify noise in the ICE exhaust system to controlling the active noise system to generate noise in the ICE exhaust system if said second signal indicates that the ICE is inactive and the vehicle is in the EV mode and/or in the eco-stop condition, wherein the noise is generated by the active noise system in dependence on at least one of: vehicle acceleration and vehicle pedal position.

* * * * *